(12) United States Patent
Rennie et al.

(10) Patent No.: US 7,843,375 B1
(45) Date of Patent: Nov. 30, 2010

(54) METHOD AND APPARATUS FOR MONITORING THE RF ENVIRONMENT TO PREVENT AIRBORNE RADAR FALSE ALARMS THAT INITIATE EVASIVE MANEUVERS, REACTIONARY DISPLAYS OR ACTIONS

(75) Inventors: Richard W. Rennie, Hudson, NH (US); John P. Truver, Bedford, NH (US)

(73) Assignee: BAE Systems Information And Electronic Systems Integration Inc., Nashua, MI (US)

( * ) Notice: Subject to any disclaimer, the term of this patent is extended or adjusted under 35 U.S.C. 154(b) by 277 days.

(21) Appl. No.: 11/653,522

(22) Filed: Jan. 16, 2007

(51) Int. Cl.
*G01S 13/87* (2006.01)
*G01S 7/36* (2006.01)

(52) U.S. Cl. .............. 342/16; 342/75; 342/81

(58) Field of Classification Search ............ 342/14
See application file for complete search history.

(56) References Cited

U.S. PATENT DOCUMENTS

| | | | | |
|---|---|---|---|---|
| 3,021,523 A * | 2/1962 | Davis et al. | .......... | 342/13 |
| 4,025,920 A * | 5/1977 | Reitboeck et al. | .......... | 342/13 |
| 4,217,580 A * | 8/1980 | Lowenschuss | .......... | 342/13 |
| 4,700,191 A * | 10/1987 | Manor | .......... | 342/13 |
| 4,876,545 A * | 10/1989 | Carlson et al. | .......... | 342/14 |
| 4,891,648 A * | 1/1990 | Jehle et al. | .......... | 342/20 |
| 4,918,455 A * | 4/1990 | Maier | .......... | 342/13 |
| 4,928,105 A * | 5/1990 | Langner | .......... | 342/192 |
| 5,061,930 A * | 10/1991 | Nathanson et al. | .......... | 342/13 |
| 5,361,069 A * | 11/1994 | Klimek et al. | .......... | 342/20 |
| 5,561,429 A * | 10/1996 | Halberstam et al. | .......... | 342/14 |
| 5,812,083 A * | 9/1998 | Johnson et al. | .......... | 342/90 |
| 6,313,794 B1 * | 11/2001 | Rose | .......... | 342/424 |
| 6,816,118 B2 * | 11/2004 | Kingsley et al. | .......... | 343/700 MS |
| 2006/0109159 A1 * | 5/2006 | Holly | .......... | 342/13 |

\* cited by examiner

*Primary Examiner*—Thomas H Tarcza
*Assistant Examiner*—Matthew M Barker
(74) *Attorney, Agent, or Firm*—Robert K. Tendler

(57) ABSTRACT

Rather than costly modifications to existing radars, a small, low cost radar warning receiver is used to monitor the RF environment. This add-on receiver can provide situational awareness including RF signal levels and angle of arrival, and recommend or provide antenna scanning synchronization, blanking inputs or gated reactionary outputs to or for the airborne radar. Utilization of this information can be used to reduce false alarms and improve system performance.

14 Claims, 3 Drawing Sheets

METHOD AND APPARATUS FOR MONITORING THE RF ENVIRONMENT TO PREVENT AIRBORNE RADAR FALSE ALARMS THAT INITIATE EVASIVE MANEUVERS, REACTIONARY DISPLAYS OR ACTIONS

FIELD OF THE INVENTION

This invention relates to airborne radars and more particularly to an add-on radar warning receiver (RWR) to prevent inadvertent false alarms due to RF interference.

BACKGROUND OF THE INVENTION

Airborne warning radars are oftentimes deployed not only on all kinds of manned military aircraft but also on unmanned aerial vehicles to be able to detect radar targets.

When such radars overfly urban environments there are numbers of RF emitters that do not constitute threats but on which the radar will falsely declare target detections.

The threat environment today, especially in the urban environment, is becoming more dense, with the cost of reacting to false alarms becoming problematic.

To date, airborne radars have not been provided with a mechanism of monitoring the RF environment to prevent such false alarms.

In a typical radar action one illuminates the environment by projecting pulses to pick up returns and decide whether or not the returns correspond to a real target or threat. The problem in accurately detecting these targets without false detections is complicated by the presence of RF interference from external RF sources.

Due to today's increased RF environment, there are both in-band signals that result in unacceptable false alarms, as well as out-of-band signals from higher-powered RF emitters. In a typical urban environment there may be four to five such RF emitters that operate outside of the frequency range of the airborne radar. Out-of-band RF emitters that are within close range proximity to the airborne radar can actually gate the returned pulses by overloading the airborne receiver. This saturation of the airborne receiver causes amplitude modulation on its radar return signal and generally results in false alarms.

SUMMARY OF INVENTION

Post analyses of most false alarms generally show that the cause of the alarm was both detectable and often times predictable. It has been found that a secondary airborne receiver having the capability to monitor the RF environment levels across all RF emitter frequencies as well as having the capability to predict high RF energy sources can prevent false alarms. This secondary receiver is programmed to inhibit false alarms from the airborne radar in the presence of known RF levels that cause these false alarms. Another feature of this secondary receiver is that it can identify known high-powered RF emitters and accurately predict future occurrences such as high-powered RF scanning. This information can be used to either blank or not look in the direction of the interfering source during the normally short period or periods of time that the interfering source is present. Costs and consequences associated with reacting to false alarms has grown considerably over time and the subject system offers a cost effective ability to lower false alarms without degrading system performance.

Thus, the subject system has as its feature that it is a very low cost, small size and weight and low power add-on to an airborne radar. As such, the add-on radar warning receiver may be used for Unmanned Aerial Vehicles to provide the ability to economically and physically integrate this unit with an airborne radar to enhance the overall combined systems performance by reducing false alarms.

Thus, rather than costly modifications to existing radars, a small, low cost add-on radar warning receiver is used to monitor the RF environment. This add-on receiver provides situational awareness, namely of RF signal levels and angle of arrival; and recommends or provides antenna scanning synchronization, blanking inputs or gated reactionary outputs to or for the airborne radar.

This subject add-on receiver operates in parallel with the airborne radar to detect and process the interfering RF signal level and signal characteristics. The processing is used to identify RF signals arriving at the airborne platform and to match their characteristics against known RF emitters. Test results of the known RF emitters on the airborne radar allow the user to program reaction of the airborne radar to the received RF signal. This add-on receiver can also provide the direction from which the interfering radar signal is arriving as well as its scan timing. This not only provides instantaneous information and reaction on the RF emitter but also allows one to predict when and in which direction the interfering radar will again look at the airborne radar, allowing users to schedule the airborne radars antenna scan to look away from the interfering radar; or one can deactivate the airborne radars alarm signal to prevent reaction to a false alarm. Thus the subject add-on receiver is designed to reduce false alarms on fielded radar systems.

The subject add-on receiver is low cost, small, in one embodiment (~3×6×9 inches, has a minimal amount of add-on weight, and draws less than 30 watts, while at the same time having an almost infinite memory capability to store known emitters and more than sufficient processing power.

In one embodiment the radar warning receiver can measure RF signal levels, pulse repetition frequency, scan rate and angle of arrival so as to be able to synchronize the antenna system of the airborne radar to not look at the external RF emitter when it is transmitting a signal in the direction of the airborne radar.

Thus, in one embodiment the subject radar warning receiver knows when an external RF emitter signal is going to occur, and simply schedules the airborne radar not to look at the RF emitter for a specified period of time.

In addition to having the airborne radar not look at a known RF emitter, one can also gate or blank the airborne radars response to signals that are known to cause interference. In a first-order approach, one would simply like to predict the outside interference that is going to affect the airborne radar and control the airborne radars operation to do something that would reduce its probability of false alarming with as little degradation as possible.

More particularly, in the subject invention, one complements a very expensive airborne radar with an inexpensive add-on that is both lightweight, small in size and one that can dramatically reduce false alarms by a simple modification of the airborne radar. Note that in one embodiment the radar warning receiver is provided with selectable, directional antennas so that it can calculate the angle of arrival of the incoming radiation and to provide a signal to schedule the airborne radar to avoid looking in the direction when the external RF emitter is transmitting at the airborne radar. Note in one embodiment, the subject radar warning receiver can operate from 1 to 20 GHz and works with both a directional antenna to obtain RF direction of arrival and an omni directional antenna to provide instantaneous RF signal analysis.

The processing done by the radar warning receiver requires both decision criteria as to what is to be done with the airborne radar to which it is attached and also to know the parameters of the RF sources that are causing the interference.

Upon detecting a match between what has been pre-stored in the radar warning receiver and the radiation that is coming in, one can, for instance, provide a system that inhibits the reaction to a false alarm or one can simply provide synchronization back to the airborne radar to prevent looking directly at an RF emitter during its transmission. Note that the subject radar warning receiver measures and stores RF environment information with microsecond accuracy which allows prediction of the next occurrence and relative to the airborne radar, when not to look in a predetermined direction. Note also that it may not be possible to prevent looking at an RF emitter in all situations. However, knowing the characteristics of the RF emitter, one can with identification criteria simply inhibit the output of the airborne radar to prevent reacting to the false alarm.

It is one object of the subject invention not to impact the prime hardware, meaning that one need do little or nothing to the airborne radar. One can do this simply by routing the output of the airborne radar through the add-on radar warning receiver.

In summary, a radar warning receiver is added on to an airborne warning radar so as to detect signals from RF emitters and to provide corrective action in terms of the airborne radar ignoring signals from these RF emitters or by directing the directional antenna of the airborne radar to look away from the RF emitter when the RF emitter emits in its direction.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
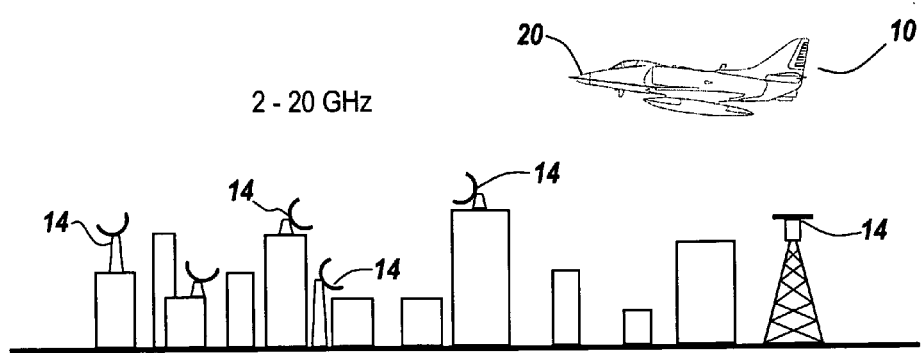
FIG. 1 is a diagrammatic illustration of the utilization of an airborne radar aboard a platform that is used to detect radar targets in an urban environment.

Referring now to FIG. 1, an aircraft 10 is used to overfly an urban environment. which includes multiple emitters 14 that are positioned about the urban environment that can provide either in-band or out-of-band RF emissions that cause the primary radar 20 carried in aircraft 10 to initiate false radar warnings.

It will be appreciated that whether or not aircraft 10 is a manned aircraft or is an unmanned aerial vehicle with severely limited stores or maneuverability, it is unacceptable to react to false alarms based on interference.

In an urban environment and indeed throughout the countryside, the presence of, location of and emission characteristics of most emitters are well known in advance. In point of fact, many of these emitters are licensed by local authorities and usually involve microwave links, broadcast emitters and more problematic very high powered aircraft surveillance and tracking radars.

While there are many emitters that provide both in-band and out-of-band interference, the most troublesome of the emitters, even if they are out of band, are the very high powered aircraft radars that are generally used to control aircraft in and around the cities and their respective airports.

Figure 2:
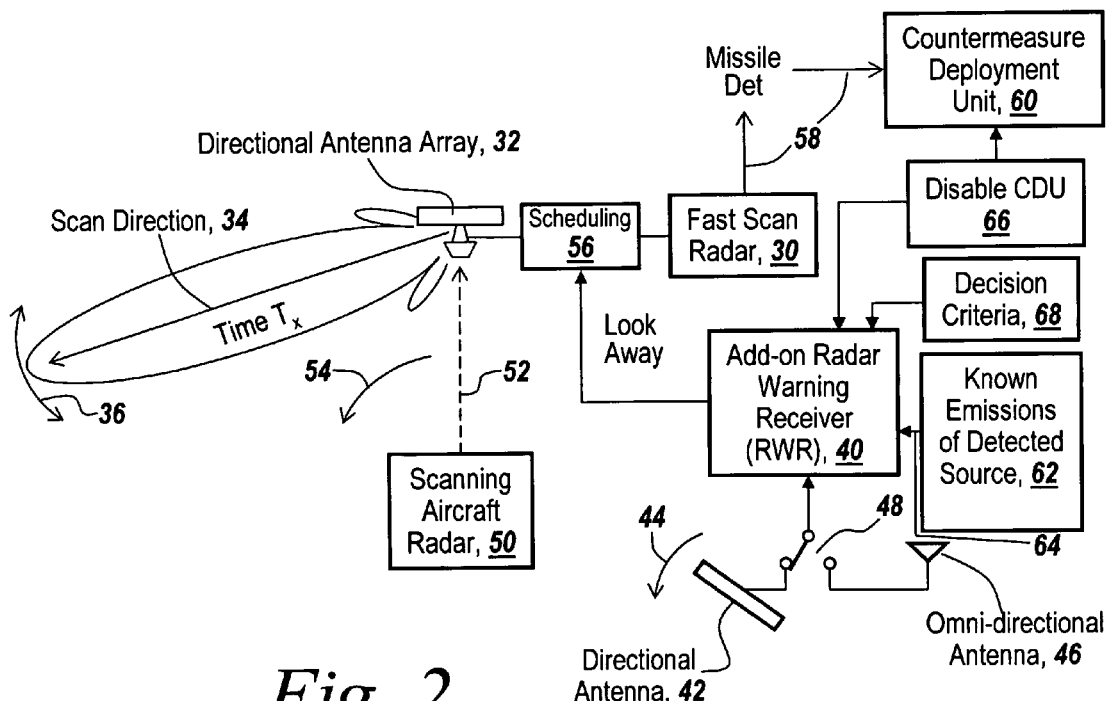
FIG. 2 is a block diagram of the subject invention in which an add-on radar warning receiver is used to sense the environment surrounding the airborne radar, which is in turn used to reschedule the airborne radar's directional antenna to not look at known RF emitters that cause false alarms.

Referring to FIG. 2, assuming that radar 20 of FIG. 1 is a fast-scan radar 30 having a directional antenna array 32 that alters its scan direction 34 as illustrated by arrow 36 so as to sweep out a surveilled area, an add-on radar warning receiver 40 is used to sense the RF environment and is added to the primary radar, the fast-scan radar 30.

Here the add-on radar warning receiver 40 is provided either with a directional antenna 42 that is scanned as illustrated by arrow 44, or is provided with an omnidirectional antenna 46, with switch 48 switching between the two.

For illustrative purposes a terrestrial megawatt scanning aircraft radar 50 is shown that at one instant in time illustrated by dotted arrow 52 projects energy towards directional antenna 32.

It is a characteristic of such a radar that it scans its beam as illustrated by arrow 54 so that radiation from this radar is not incident on directional antenna 32 for more than a couple of milliseconds.

If the characteristics of radar 50 are known, including its scan rate, frequency, pulse repetition frequency or rate and other characteristics, then add-on radar warning receiver 40 can be used to control the scheduling 56 of directional antenna 32 so as to have antenna 32 look away from radar 50 at a time $T_x$ when radar 50 is pointed at antenna 32.

In order to accomplish the rescheduling of the direction of antenna 32, radar warning receiver 40 calculates the angle of arrival of the emissions from radar 50 and is able to re-direct the directional antenna 32 away from the direction of the incoming signals from radar 50, at least for those time periods at which radar 50 is pointing at directional antenna 32.

It is the purpose of fast-scan radar 30 to provide detection signals or alarms over line 58 to deploy or activate countermeasures 60 or warn the operator, so as to be able to react to declared threats.

In order for the add-on radar warning receiver 40 to be effective, as illustrated at 62 one pre-loads known parameters of problematic emitters and their interfering power level thresholds as illustrated at 64 into the radar warning receiver's memory.

Upon a match of detected emissions with known emissions, the countermeasure unit 60 may be disabled as illustrated at 66, assuming that the detected radiation at the radar warning receiver meets certain decision criteria as illustrated at 68.

Simply put, an add-on unit is provided to a primary radar to sense interference and to inhibit countermeasure action when this interference is detected; or if possible re-direct the primary radar's directional antenna so as not to look at the particular source that is detected by the radar warning receiver.

Figure 3:
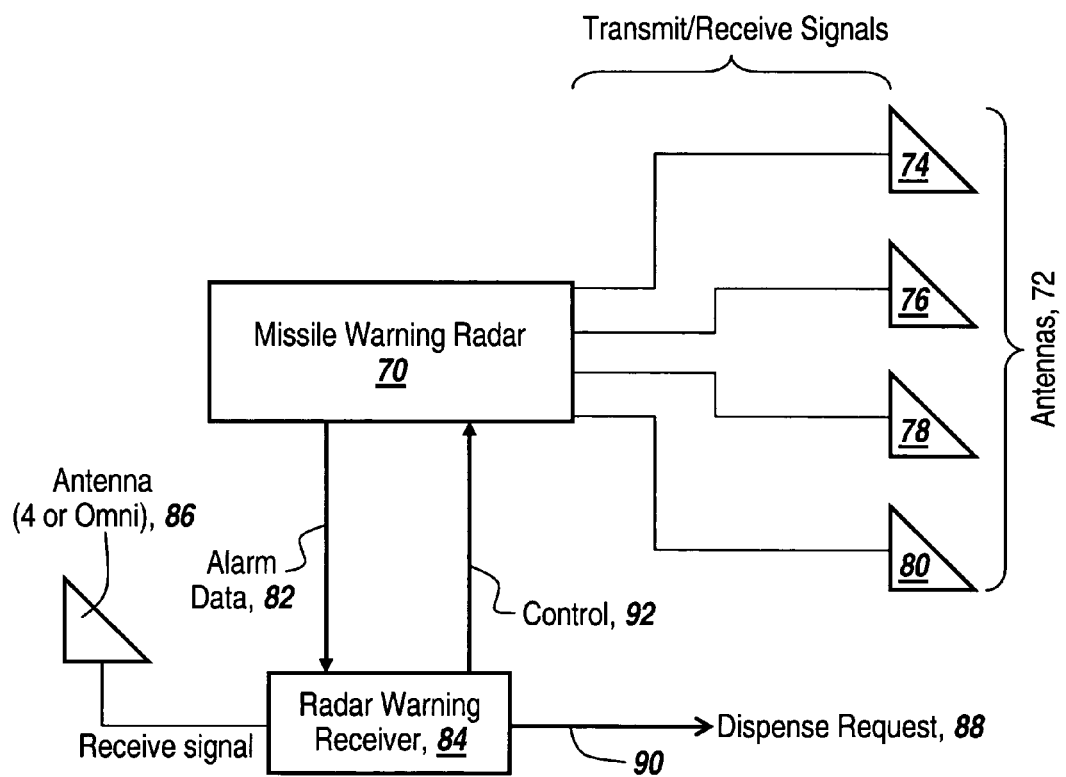
FIG. 3 is a block diagram illustrating the coupling of a radar warning receiver to a radar, indicating the use of an omni directional antenna or directional antenna coupled to the radar warning receiver in which the characteristics and time of occurrence of emissions from RF emitters are detected by the radar warning receiver and alarm data passing through the radar warning receiver is inhibited so as to prevent unwanted declaration of false alarms.

Referring to FIG. 3, in its simplest form a threat warning radar 70 has a directional antenna 72 composed of elements 74, 76, 78 and 80, which constitute a steerable array.

Upon detection of returns indicating a threat, an alarm signal or other data is coupled over line 82 to the radar warning receiver 84 that is coupled to the primary radar.

The radar warning receiver is provided with a directional or omnidirectional antenna 86 that samples the emissions from the RF environment and inhibits a countermeasure action request 88 over line 90 in the presence and correlation of an RF interference emitter.

Additionally, with calculation of the angle of arrival and various known timing sequences of the radar, a control signal over line 92 is used to direct the antenna array to a direction other than that direction from which the known RF emission is coming.

Figure 4:
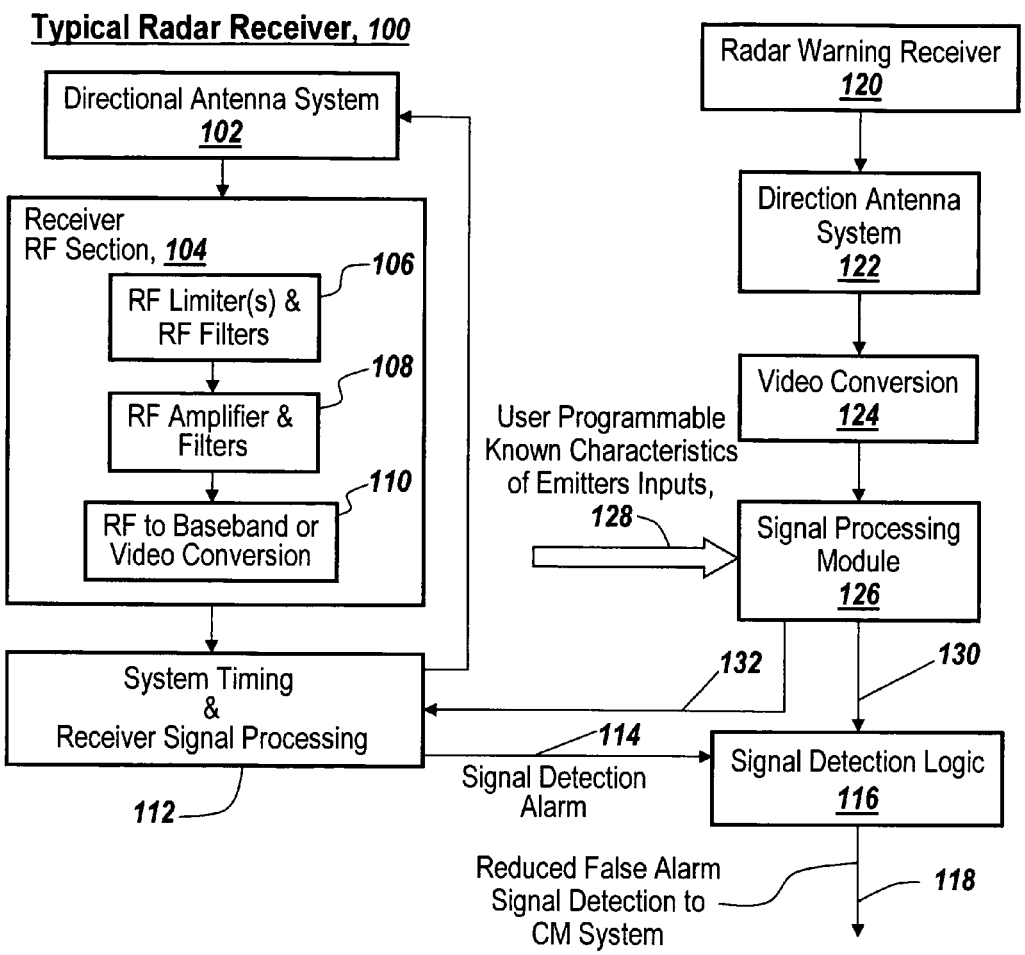
FIG. 4 is a high-level flow chart of a typical radar receiver and a radar warning receiver modification that uses known emitter characteristics and decision criteria to either control the direction of the directional antenna used by the airborne radar or to inhibit false alarm detection signals from being sent to situational awareness displays or automatic reactionary systems like decoy dispensers or onboard RF jamming emitters.

Referring now to FIG. 4, from a high level point of view, a typical radar 100 is provided with a directional antenna system 102, which is coupled to the RF receiver section 104 of the radar. This receiver section has the usual RF limiters and filters 106, RF amplifiers and filters 108, and an RF-to-baseband or video conversion unit or module 110. Signals indicative of pulse returns are coupled to a system timing and receiver signal processing unit 112, which upon detection of a return indicative of a radar threat provides a signal over line 114. This signal constitutes an alarm signal to enable logic 116 that produces signals over line 118 to initiate countermeasures.

Coupled to this typical radar is a radar warning receiver modification 120 in the form of an add-on, which in one embodiment uses a directional antenna system 122, with the signals from the directional antenna coupled to a broadband RF receiver section that is in turn coupled to a video conversion section, as illustrated at 124, to provide signals to radar warning receiver signal processing module 126.

It is the purpose of signal processing module 126 to identify the emitter, its location, the received signal strength and emitter timing information, and to compare it with a user-programmable known characteristics of emitters input over line 128. Also input to signal processing module 126 are decision criteria by which the processor can recognize RF emitters, their characteristics and upon detection of same, provides a signal over 130 to inhibit logic 116 from sending a control signal over line 118 to initiate countermeasures.

Also, a signal is applied over line 132 for antenna synchronization purposes to signal processing unit 112 in radar 100 to command the directional antenna 102 to point away from the detected location of the RF emitter.

What can be seen is that with a simple and cost-effective radar warning receiver, one can significantly reduce the false alarm rate for the primary radar, which falses on RF interference from known RF emitters and their problematic power levels.

While the subject invention has been described in terms of urban environments, other environments are clearly within the subject matter of this invention. For instance, suburban environments or any environments in which terrestrial emitters are known and characterized are within the scope of the subject invention.

As a result of the coupling of a radar warning receiver to a primary radar, one can reduce the false alarm rate to negligible levels so as to preserve countermeasure stores or prevent unnecessary countermeasures actions such as evasion or chaff dispersing.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a airborne warning radar system in which an airborne warning radar is located aboard an aircraft and has a scanning radar antenna, a system for ignoring signals from known RF emitters, comprising:
   a radar warning receiver that monitors the RF environment overflown by said aircraft for identifying an RF emitter, for detecting the direction of the source of the RF emitter and for causing the antenna for the airborne warning radar to look away from the specific detected direction, whereby false alarms may be reduced for said airborne warning radar.

2. The system of claim 1, and further including a countermeasure module, wherein said airborne warning radar outputs a countermeasure fire control signal to said countermeasure module for the activation thereof, and wherein said radar warning receiver includes a unit for de-activating the fire control signal coupled to the countermeasure module responsive to a detected known RF emitter, thus to prevent false countermeasure activation.

3. The system of claim 2, wherein said radar warning receiver includes an omnidirectional antenna.

4. The system of claim 1, wherein said radar warning receiver includes a directional antenna, including a directional array for altering the direction of said directional antenna and a signal processing module for ascertaining the direction of said known RF emitter from the direction of said directional antenna.

5. The system of claim 1, wherein said radar warning receiver includes storage for storing the characteristics of known RF emitters and wherein said identifying step includes the steps of detecting the characteristics of an emitter and matching the detected characteristics with the stored characteristics of known RF emitters.

6. A system for lowering the false alarm rate of a primary radar, comprising:
   a radar warning receiver operably coupled to said primary radar for detecting and identifying emissions from a non-hostile radar and for causing said primary radar to ignore emissions from a detected known RF emitter, said primary radar including a scanning directional antenna that sweeps out a surveilled area and wherein said radar warning receiver causes said directional antenna to look away from the specific direction of a detected known RF emitter.

7. The system of claim 6, wherein said primary radar, upon detection of predetermined radar returns, generates a countermeasure activation signal and wherein said radar warning receiver, upon detection of a known RF emitter, inhibits the generation of said countermeasure activation signal, whereby false alarms are reduced.

8. The system of claim 6, wherein said primary radar transmits pulses into a surveilled area and wherein said radar warning receiver detects known RF emitters in said surveilled area.

9. A method for reducing the false alarm rate of a primary missile warning radar that scans a surveilled area and activates a countermeasure module upon detection of a predetermined target, comprising the steps of:

coupling a radar warning receiver capable of detecting and identifying known RF emitters in the surveilled area to the primary radar; and, causing the primary missile warning radar to ignore signals from detected and identified known RF emitters, the primary missile warning radar including a directional antenna that scans the surveilled area and wherein the step of ignoring signals from known RF emitters includes causing the directional antenna to look away from a specific detected and identified known RF emitter.

10. The method of claim 9, wherein said ignoring step includes the step of inhibiting the operation of the primary missile warning radar to activate the countermeasure module upon detection and identification of a known RF emitter.

11. The method of claim 9, wherein the step of detecting and identifying a known RF emitter includes the step of storing the characteristics of known RF emitters in the surveilled area and comparing the signals from any received emitters to the stored characteristics, such that upon a match an emitter is identified as a known RF emitter.

12. The method of claim 9, wherein the step of inhibiting the primary radar includes the step of interrupting the activation signal to the countermeasure module based on the match.

13. A low-cost, small-sized add-on to a primary airborne radar for the control thereof, comprising:

a radar warning receiver having an antenna adapted to receive signals from emitters within the area surveilled by the primary airborne radar; and, a module for inhibiting the primary missile warning radar based on known RF emitters detected and identified by said radar warning receiver, said primary airborne radar including a directional antenna that is made to sweep said surveilled area and wherein said radar warning receiver produces signals for causing said directional antenna to look away from the specific direction of an identified and detected known RF emitter.

14. The system of claim 13, wherein said primary airborne radar includes a module for generating a countermeasure activation signal and wherein said radar warning receiver includes a unit for inhibiting said countermeasure activation signal upon detection and identification of a signal from a known RF emitter.

* * * * *